April 25, 1967     E. W. FARMER     3,315,285
PLASTIC BUOY
Filed Feb. 1, 1965
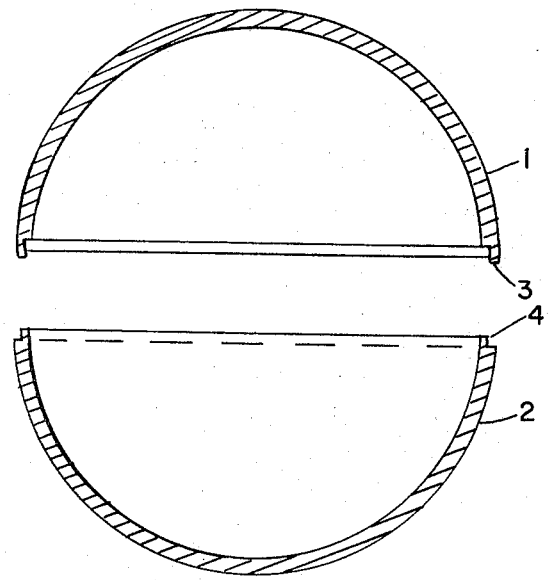
FIG. 1.
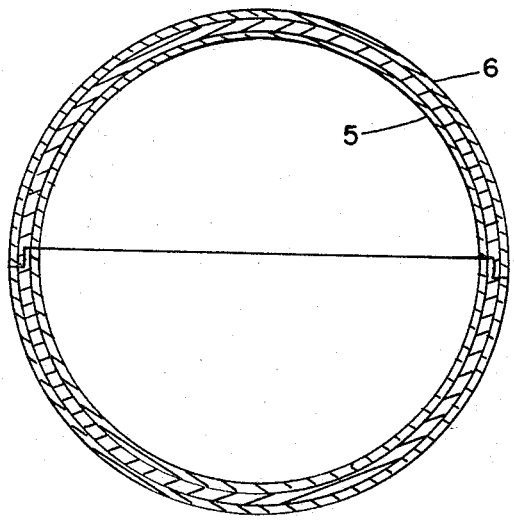
FIG. 2.
INVENTOR
EVERETT WALTER FARMER
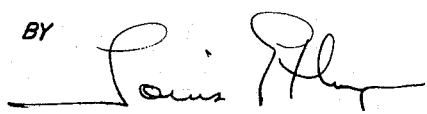
ATTORNEY 3,315,285
PLASTIC BUOY
Everett Walter Farmer, Reeds Ferry, N.H., assignor to Sanders Associates, Inc., Nashua, N.H., a corporation of Delaware
Filed Feb. 1, 1965, Ser. No. 429,437
5 Claims. (Cl. 9—8)

This invention relates to a buoy, and more especially to a plastic buoy.

It is well known that ball buoys used in open water, such as the oceans or the Great Lakes, are subject in use to severe conditions, among them buffeting by waves, and constant exposure to the elements, with resultant undesired water absorption. In addition, in being placed in position, they are frequently dropped from aircraft without the use of slowing devices and hit the water with great force, subjecting them to heavy shock impact, which may produce deceleration forces as high as 8,000 g.

I have discovered the unexpected result that when a plastic is coated with a thin coating of metal, for example, of the order of 0.001″ in thickness, the impact and shock resistance of the plastic may be increased as much as 300% over that of the same material unplated with the addition of only a 6% increase in weight. I have discovered that such a plating also materially reduces the water absorbency of the plastic, a desirable result in buoys.

In addition I have also determined that the strength of a buoy that is to undergo these adverse launch conditions is greatly enhanced when a thin metallic coating is applied which acts to compress the surface so treated.

From the foregoing, it will be understood that among the objects of my invention are:

To provide a plastic metal-plated buoy having substantially increased shock and impact resistance over what it would have if unplated, To provide such a buoy having decreased water absorbency over what it would have if unplated, To provide such a buoy utilizing the unexpected result of increased shock and impact resistance resulting from the application of a metallic coating of the order of one mil in thickness, To provide a metal coating to a buoy that places the surfaces of the buoy both interior and exterior in a compressive state to thereby greatly strengthen the buoy.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which FIG. 1 is a diagrammatic sectional view of the two mating halves of a ball buoy before plating, and before the halves are fastened together, and FIG. 2 is a similar sectional view of such a buoy after the halves are plated inside and out and joined together.

Referring now more particularly to the drawing, in the embodiment shown, the buoy may comprise a pair of hemispherical parts 1 and 2 formed of molded plastic, preferably an arcylonitrile-butadiene-styrene resin or the equivalent, obtainable from Marbon Chemical Division of Borg-Warner Corporation, and sold under the designations "Cycolac EP-3501" and 3510, and ABS resin, and may be injection or compression molded. Any suitable plastic or resin may be utilized.

In molding the hemispheres 1 and 2, coacting outer and inner lips 3 and 4 may be formed at the rims to facilitate assemblying the halves together. In so doing, a layer of suitable cement may be applied along the lips to seal the halves together and prevent escape of air and flow of water into the interior of the buoy.

In accordance with this invention, in order to apply the coating of metal to the parts 1 and 2, the parts are first cleaned in an alkaline cleaner, which removes any oily deposits such as spots, fingerprints, etc. Next the articles are given an acid neutralization dip, to ensure that no alkaline cleaner is carried over into the subsequently used acid solutions.

The surfaces of parts 1 and 2 are then conditioned, sensitized, and activated. The surface conditioner is preferably a chromic acid surface conditioner obtainable from Enthone, Inc., under the name "Enplate Conditioner 470," or the equivalent. This surface conditioner is strongly acid, and alters the surface of the plastic, promoting a strong chemical bond between the plastic and metal, thereby eliminating expensive mechanical operations such as roughening of the plastic and final buffing of the metal plate, and allows the plating to be completed in a fraction of the time required by the old methods.

The surface is then sensitized by aplication of surface sensitizer such as dilute stannous chloride or the equivalent, followed by the application of a surface activator solution of palladium chloride or the equivalent, forming a base suitable for "electroless" (non-electroplated) copper deposition. "Electroless" (chemical reduced) copper is then deposited on the parts, followed by electroplating of copper, and if desired, nickel/chrome, nickel/gold, or other desired metal, to provide corrosion resistance and high reflectivity.

It should be understood that the selection of some metals will cause the surface so treated to be placed in a state of compression, while other metals will place the surface in tension. In particular it is known that a bright nickel finish as opposed to a dull nickel finish will place a compressive condition on the surface of the buoy. In air launched buoy applications high impact shock conditions are present. In these circumstances the compressive condition is desirable because, upon impact, the buoy must overcome as it deforms, the compressive prestress thereto before the buoy's plastic begins its deflection. This obviously greatly enhances the buoy's capacity to withstand the shock of impact loading where for example the buoy is air launched.

It should also be noted that where a buoy of this nature is filled with electronic gear such as a transmitter and an antenna, the metallized surface of the buoy also acts as an effective ground plane to thereby enhance the transmission of signals from the buoy. In addition it should be understood that this invention is not limited to any specific shaped buoy. This invention may be employed to cover a variety of shaped devices wherever there is the need for high impact strength and light weight.

After the final plating, the parts are removed from the bath, dried, and assembled together as previously described, and the buoy is ready for use. It may be incorporated as the buoyance chamber in an assembly containing other parts and equipment which are not, per se, a part of the invention claimed herein.

While in the foregoing I have shown and described my invention and the best mode presently known to me for practising the same, it should be understood that modifications and changes may be made without departing from the spirit and scope of my invention, as well be clear to those skilled in the art.

What is claimed is:

1. The new article of manufacture consisting of a ball buoy having two mating parts arranged to fit together to form a buoyant chamber, said parts being formed of plastic material, and having a homogeneous coating of nickel substantially increasing the strength and shock resistance characteristic of the same material without said coating, and reducing the water absorbency of said plastic material, said coating having a thickness so small as to have negligible effect on the volume of said chamber, and said coating acting to place a compressive force upon the surfaces of said parts to thereby cause said buoy to resist the shock of an impact.

2. The new article of manufacture claimed in claim 1, in which said parts are symmetrical.

3. An air launched free falling buoy having two mating hemispheres arranged to fit together to form a buoyant sphere, said hemispheres being formed of plastic material, and having a homogeneous coating of nickel substantially increasing the strength and shock resistance characteristic of the same material without said coating, and reducing the water absorbency of said plastic material, said coating having a thickness so small as to have negligible effect on the volume of said sphere, said coating acting to place a compressive force upon the surfaces of said hemispheres to thereby cause said buoy to resist the shock of an impact.

4. The article of claim 1 wherein said plastic parts are formed of an acrylonitrile-butadiene-styrene resin.

5. The air launched free falling buoy of claim 3, wherein the inside and outside surfaces of said hemispheres are coated with said nickel layer, and said nickel layer has a thickness which is not substantially more than one mil.

References Cited by the Examiner

UNITED STATES PATENTS 1,299,851   4/1919   Mori _____ 204—20
2,389,386   11/1945  Russell _____ 117—125

FOREIGN PATENTS 681,887   10/1952   Great Britain.

OTHER REFERENCES

Metal Finishing Manual: A Chilton Publication, New York, pp. 119–120.

Lowenheim, Frederick A.: Modern Electro-plating. John Wiley and Sons, New York, 2nd edition, 1963, p. 270.

MILTON BUCHLER, *Primary Examiner.*

T. MAJOR, *Assistant Examiner.*